United States Patent [19]
Gmeiner et al.

[11] 3,782,218
[45] Jan. 1, 1974

[54] ADJUSTABLE AND TILTABLE REARVIEW MIRROR ESPECIALLY FOR PASSENGER MOTOR VEHICLES

[75] Inventors: Günter Gmeiner, Sindelfingen; Christian Grabner, Maichingen; Gerhard Sigmund, Stuttgart; Rudolf Binder, Schonaich, all of Germany

[73] Assignee: Daimler-Benz Aktiengesellschaft, Stuttgart, Germany

[22] Filed: July 27, 1971

[21] Appl. No.: 166,435

[30] Foreign Application Priority Data
July 27, 1970 Germany................... P 20 37 101.1

[52] U.S. Cl. ................................................. 74/491
[51] Int. Cl. .............................................. G05g 1/00
[58] Field of Search .................... 74/491, 501 M; 248/475 A, 475 B

[56] References Cited
UNITED STATES PATENTS
| | | | |
|---|---|---|---|
| 3,436,049 | 4/1969 | DeClaire et al. | 248/475 A |
| 3,618,420 | 11/1971 | Horwitt et al | 74/501 M |
| 3,642,245 | 2/1972 | Wohnlich | 248/475 B |

Primary Examiner—Milton Kaufman
Attorney—Craig, Antonelli & Hill

[57] ABSTRACT

An outside rearview mirror adapted to be remotely adjusted from within the vehicle interior space and adapted to be tilted by pivoting in a direction opposite the driving direction in case of an accident, especially for passenger motor vehicles in which a hinge for a housing is provided that is adapted to be secured at the vehicle; a mirror glass support which is supported in the housing, is adapted to be adjusted by way of an actuating lever connected therewith and projecting into the vehicle interior space.

26 Claims, 8 Drawing Figures

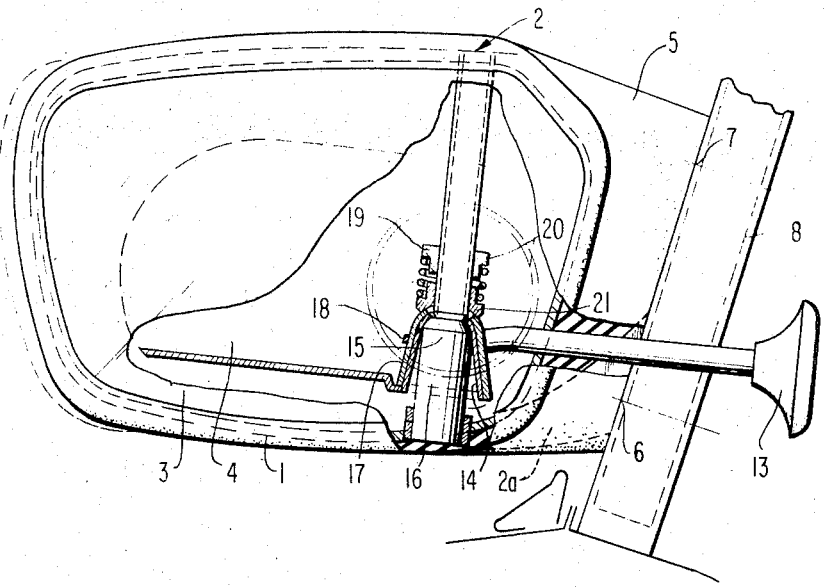
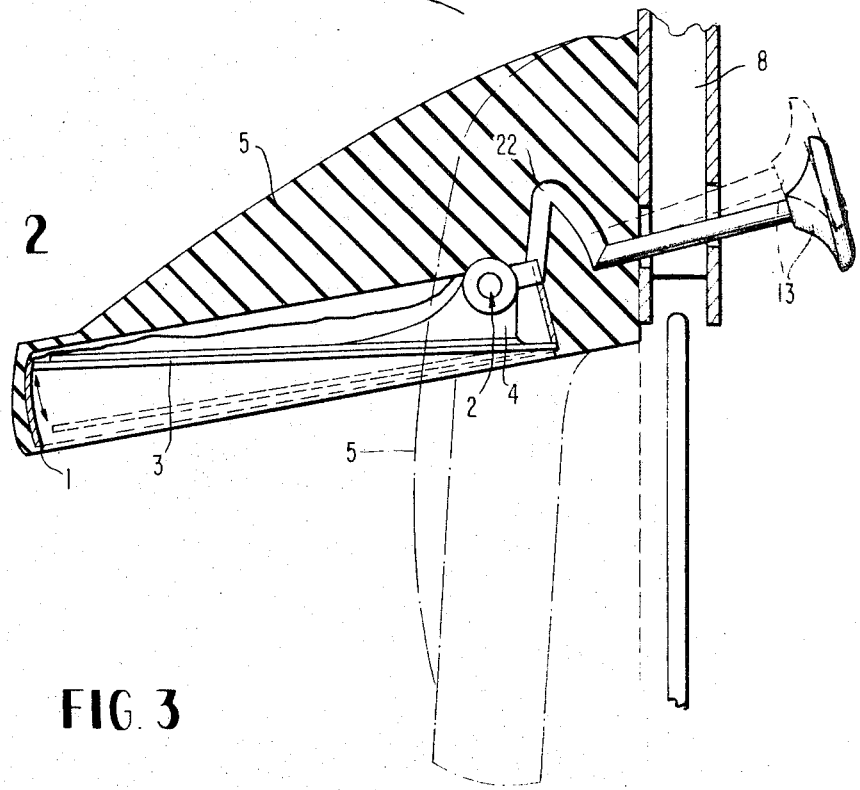
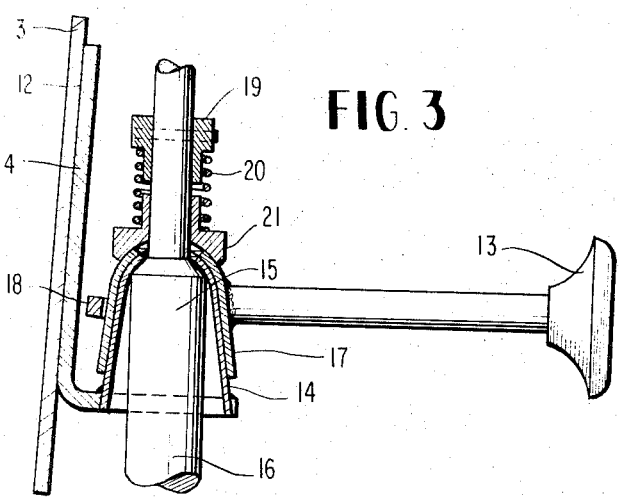
INVENTORS
GÜNTER GMEINER
CHRISTIAN GRABNER
GERHARD SIGMUND
RUDOLF BINDER
BY Craig, Antonelli & Hill
ATTORNEYS

INVENTORS
GÜNTER GMEINER
CHRISTIAN GRABNER
GERHARD SIGMUND
RUDOLF BINDER

BY Craig, Antonelli & Hill
ATTORNEYS

PATENTED JAN 1 1974
3,782,218
SHEET 3 OF 3

INVENTORS
GÜNTER GMEINER
CHRISTIAN GRABNER
GERHARD SIGMUND
RUDOLF BINDER

BY Craig, Antonelli & Hill

ATTORNEYS

ADJUSTABLE AND TILTABLE REARVIEW MIRROR ESPECIALLY FOR PASSENGER MOTOR VEHICLES

The present invention relates to an outside rearview mirror, especially for passenger motor vehicles, which is remotely adjustable from the vehicle inside and is adapted to be pivoted opposite the driving direction.

The known rearview mirrors of this type are based on the principle of a Bowden-cable adjusting mechanism which entails certain disadvantages.

The present invention is concerned with the task to avoid the disadvantages of this known principle and to provide a simple, direct actuating mechanism which additionally permits a pivoting of the mirror toward the body of the vehicle in case of an accident. The present invention essentially consists in that a hinge adapted to be secured at the vehicle is provided for a housing, in which is mounted a mirror glass support that is adjustable by way of an actuating lever connected therewith and projecting into the vehicle interior space. A simple and direct possibility thus results to adjust the mirror without the possibility of play and thus of an adjusting error existing within the adjusting mechanism.

It is advantageous for the safety in case of an accident, if the pivot axis of the hinge is disposed approximately perpendicularly to the driving direction and parallel to the vehicle body outer wall or door. It is particularly advantageous if all parts disposed on the outside of the vehicle are accommodated in a cap made from elastic material, preferably in a rubber cap which is provided with an opening leaving exposed the mirror glass. Advantageously, the cap may be secured at the vehicle, for example, at the vehicle door. The entire cap is deformed in case of an impact into a position parallel to the vehicle body.

In order to create clear geometric conditions for the adjustment of the mirror support and for the pivoting of the entire rearview mirror, it is advantageous if a transmission mechanism is provided between the actuating lever and the mirror glass support member which has an axis of rotation or pivot axis that is disposed approximately in the hinge axis at least in the pivoted-in position of the outside mirror.

A structurally simple embodiment of the present invention is achieved if the hinge supporting the housing possesses a pivot shaft on which the mirror glass support is journalled. The pivot pin may thereby be provided in an advantageous manner with an extension, in turn provided with a hemispherically shaped surface on which is supported a sleeve of the mirror glass support having a corresponding surface. It is thereby appropriate if the sleeve of the mirror glass support is surrounded by means of a further sleeve at which is secured the actuating lever. In order to establish a connection between the actuating lever an the mirror glass support, the sleeve of the actuating lever and the mirror glass support, may be connected with each other in a base position by means of a detent mechanism. It is furthermore of advantage if the sleeve of the actuating lever and therewith the sleeve of the mirror glass support are stressed or spring-loaded in the direction of the extension of the pivot pin by means of a compression spring. In order not to impair the adjustability, it is appropriate if a counter-abutment is arranged between the compression spring and the sleeve which preferably possesses a spherically-shaped, socket-like surface for the abutment at the sleeve. In order not to impair with this type of construction of the present invention the movement of the housing and/or of the mirror glass support during the pivoting or tilting over in case of an accident, the actuating lever may be provided with a bulged-out portion extending in the driving direction for the accommodation of the tilted housing and/or mirror support.

In another embodiment of the present invention, the housing is adapted to be connected directly with the vehicle or door by way of a hinge and the mirror glass support is supported in the housing and at a transmission linkage which is connected with the actuating lever that is adapted to be supported in the vehicle. Also in this embodiment, it is of advantage if a springy or elastic detent for fixing the base position of the housing is arranged in the hinge. In order to be able to adjust the mirror glass support in all directions, the actuating lever may be adapted to be supported at the vehicle by means of a spherically shaped head portion in a spherically shaped socket whereas the mirror glass support is retained by means of a spherically shaped head portion in a spherically shaped socket of the housing.

Accordingly, it is an object of the present invention to provide a remotely adjustable, safety outside-rearview-mirror, especially for passenger motor vehicles, which avoids the aforementioned shortcomings and drawbacks encountered in the prior art.

Another object of the present invention resides in a remotely adjustable outside rearview mirror, adapted to be tilted over by pivot movement against the outside of the vehicle body in case of accidents, which avoids the need of Bowden-cables or the like for its adjustments.

A further object of the present invention resides in a safety outside rearview mirror, especially for passenger motor vehicles, which is remotely adjustable from within the passenger space, yet utilizes a simple as well as direct actuating mechanism permitting a pivoting of the entire outside mirror in a direction opposite the driving direction in case of accidents.

Still a further object of the present invention resides in a remote adjusting mechanism for a safety outside rearview mirror of passenger motor vehicles which provides a simple adjusting mechanism that is substantially free of any play and thus of any adjusting errors.

These and other objects, features and advantages of the present invention will become more apparent from the following description when taken in connection with the accompanying drawing which shows, for purposes of illustration only, several embodiments in accordance with the present invention, and wherein:

FIG. 1 is an elevational view, taken in the driving direction of a motor vehicle, of an outside rearview mirror in accordance with the present invention;

FIG. 2 is a plan view on the outside rearview mirror according to FIG. 1;

FIG. 3 is a partial cross-sectional view, on an enlarged scale, illustrating certain details of the outside rearview mirror of FIG. 1;

Figure 4:
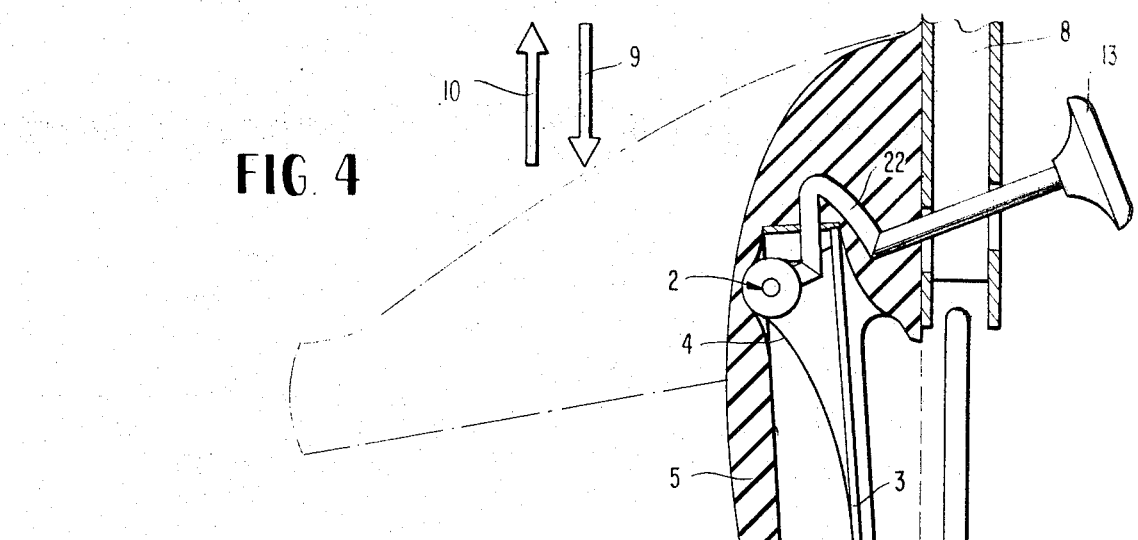
FIG. 4 is a plan view, similar to FIG. 2, on the outside rearview mirror of FIG. 1 in the tilted-over position.

Referring now to the drawing wherein like reference numerals are used throughout the various views to designate like parts, and more particularly to FIGS. 1 to 4, the outside rearview mirror illustrated in these figures includes a rigid housing 1 which is supported in a hinge generally designated by reference numeral 2. The mirror glass 3 which is movably arranged in the housing 1, is supported on the same hinge 2 by means of a mirror glass support member 4. The hinge 2 is rigidly connected with the body by means of the mounting element 2a and is disposed on the inside of the rubber cap 5 which is secured at the places 6 and 7 by means of screws or the like at the vehicle body, for example, at the door 8. The rubber cap 5 encloses all of the parts of the outside rearview mirror disposed outside of the vehicle and is provided only with an opening for the mirror glass 3. In case of an accident impact in the direction of the arrow 9 of FIG. 4, which is directed opposite to the driving direction 10, the mirror is adapted to be pivoted about the hinge 2 into the position illustrated in dash and dot lines in FIG. 2 and in full lines in FIG. 4 whereby the rubber cap 5 deforms.

The mirror glass 3 and the mirror support 4 are connected with each other by way of a layer 12 of glue or other suitable bonding material (FIG. 3) of any suitable known type. The mirror glass support 4 is adapted to be pivoted between the position shown in full line and the position shown in dash lines by way of an actuating lever 13 projecting through a slot of the vehicle door 8 into the vehicle interior space.

The mirror glass support 4 includes a bell-shaped sleeve 14 which is supported by means of a corresponding surface on an extension 15 of the pivot pin 16 of the hinge 2, having a spherically shaped surface. The bell-shaped sleeve 14 of the mirror glass support 4 is surrounded by an also bell-shaped sleeve 17, constructed in a similar manner, which is securely connected with the actuating lever 13, for example, by welding. A connection between the two sleeves 14 and 17 is established in a base position by a detent spring 18 so that the mirror glass support 4 and therewith the mirror glass 3 are adjustable by way of the actuating lever 13. An abutment 19 is secured at the pivot pin 16, on which is supported a compression spring 20 which acts by way of a counter-abutment 21 on the sleeve 17 and therewith also on the sleeve 14 which is thus pressed against the surface of the pivot shaft 16. The mirror glass 3 and the mirror glass support 4 are thus both rotatable about the pivot shaft 16 and also pivotal within a certain limit about an angle by way of the actuating lever 13.

Since the hinge 2 and the actuating mechanism for the adjustment of the mirror glass support 4 possess the same axis, i.e., are coaxial, the entire outside rearview mirror can be readily tilted by pivoting about the hinge 2. In order not to impair the tilting by the presence of the actuating lever 13, the latter includes a bulged-out portion 22 (FIG. 2) pointing in the driving direction into which the mirror glass support 4 and the mirror 2 are pivoted during tilting over.

Figure 5:
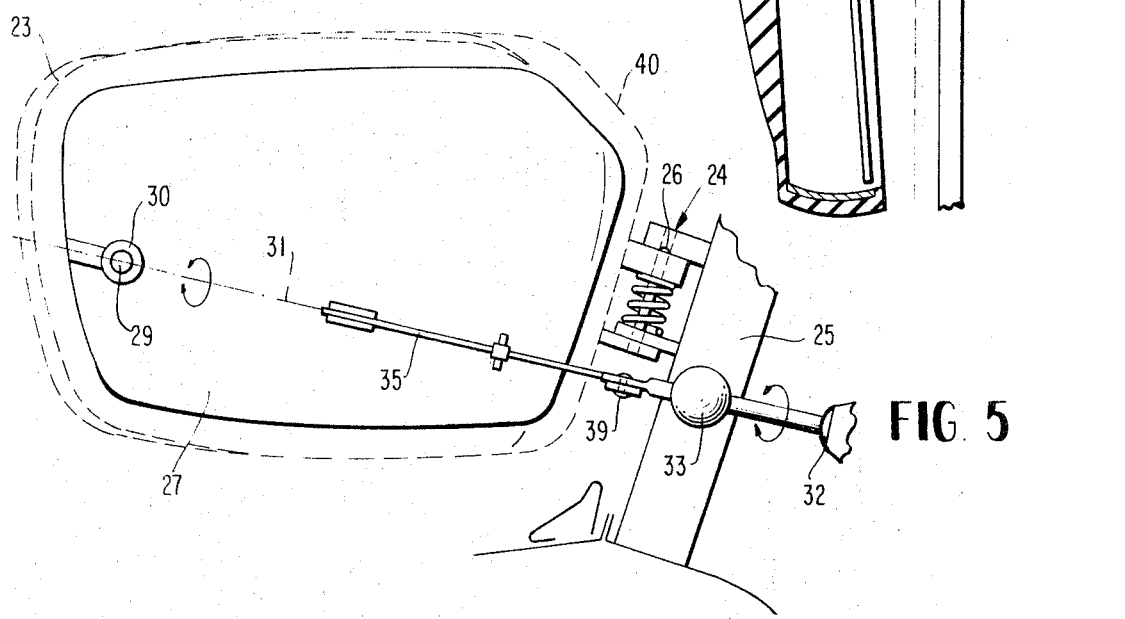
FIG. 5 is an elevational view of a further embodiment of an outside rearview mirror in accordance with the present invention taken in the driving direction.
Figure 6:
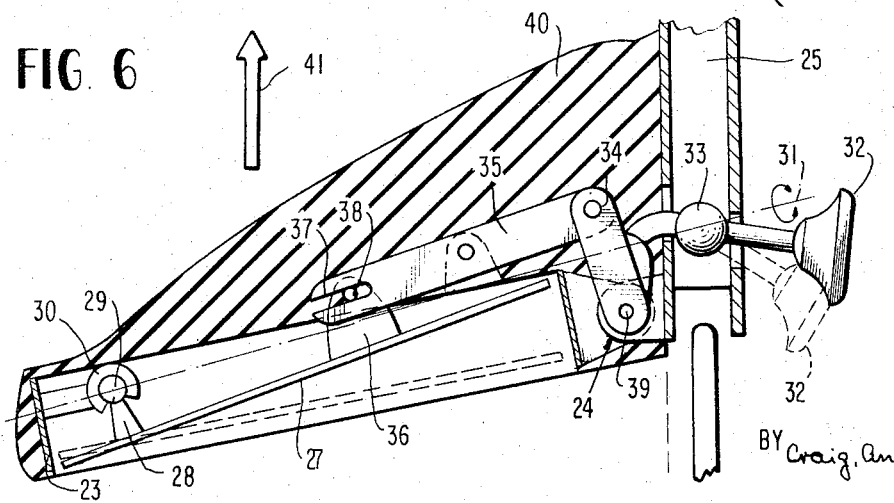
FIG. 6 is a plan view on the outside rearview mirror according to FIG. 5.
Figure 7:
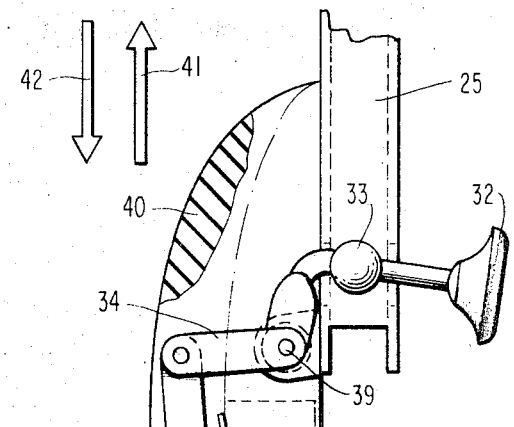
FIG. 7 is a plan view on the outside rearview mirror according to FIGS. 5 and 6 in the tilted-over position.

In the embodiment according to FIGS. 5 to 7, a rigid housing 23 preferably made from metal is also provided which is connected by way of a hinge generally designated by reference numeral 24 directly with the door 25 of a motor vehicle. An elastic or springy detent 26 of any conventional type is arranged in the hinge 24, which secures the base position of the housing illustrated in the tilted-out position in FIGS. 5 and 6. The axis of rotation of the hinge 24 extends in this embodiment of the present invention, parallel to the outer surface of the door 25 and approximately perpendicularly to the driving direction.

A mirror glass 27 is adjustably supported in the housing 23. The mirror glass 27 includes a mirror glass support 28 which has a spherically shaped head portion 29 that is retained in a spherically shaped socket 30 which is mounted securely at the housing 23. The mirror glass 27, by reason of this support, is pivotal both about a vertical axis as also about a horizontal axis 31. The pivoting of the mirror glass 27 takes place by way of a transmission linkage, by means of which it is connected with an actuating lever 32. The actuating lever 32 includes a spherically shaped head portion 33 by means of which it is supported in a spherically shaped socket (not shown) of the door 25. The actuating lever 32 is connected by way of two further levers 34 and 35 with a lever extension 36 of the mirror glass 27. The lever 35 engages via a slot 37 therein with a pin 38 of the lever extension 36 in order to permit the relative movement occurring between these two parts during the pivoting. The actuating lever 32 is angularly bent outside of the door 25 in such a manner that in its position illustrated in FIG. 6 the axis of rotation 39 of the transmission linkage is disposed in the axis of rotation of the hinge 24, i.e., is coaxial therewith. All of the parts disposed outside the vehicle body are also arranged in this embodiment of the rearview mirror inside of a rubber cap 40 which is provided with only an opening toward the outside for the mirror glass 27.

In this embodiment, the mirror glass is adapted to be pivoted with the aid of the actuating lever 32 between position of the mirror glass pane 27 shown in full and that shown in dash lines. The actuating lever 32 thereby moves from its full line position into the dash line position. In addition to this pivoting which takes place essentially about a vertical axis of the spherically shaped head portion 29, a pivoting about the horizontal axis 31 is also possible by rotation of the actuating lever 32. The outside rearview mirror is adapted to be tilted by pivoting in case of an impact in the direction of the arrow 42 opposite the driving direction 41 into the position illustrated in FIG. 7. The actuating lever 32 thereby assumes automatically with its axis of rotation 39 the position illustrated in FIG. 7 in which it is coaxial with the axis of rotation of the hinge 24, even though it has previously assumed another position for the adjustment of the mirror glass 27.

Figure 8:
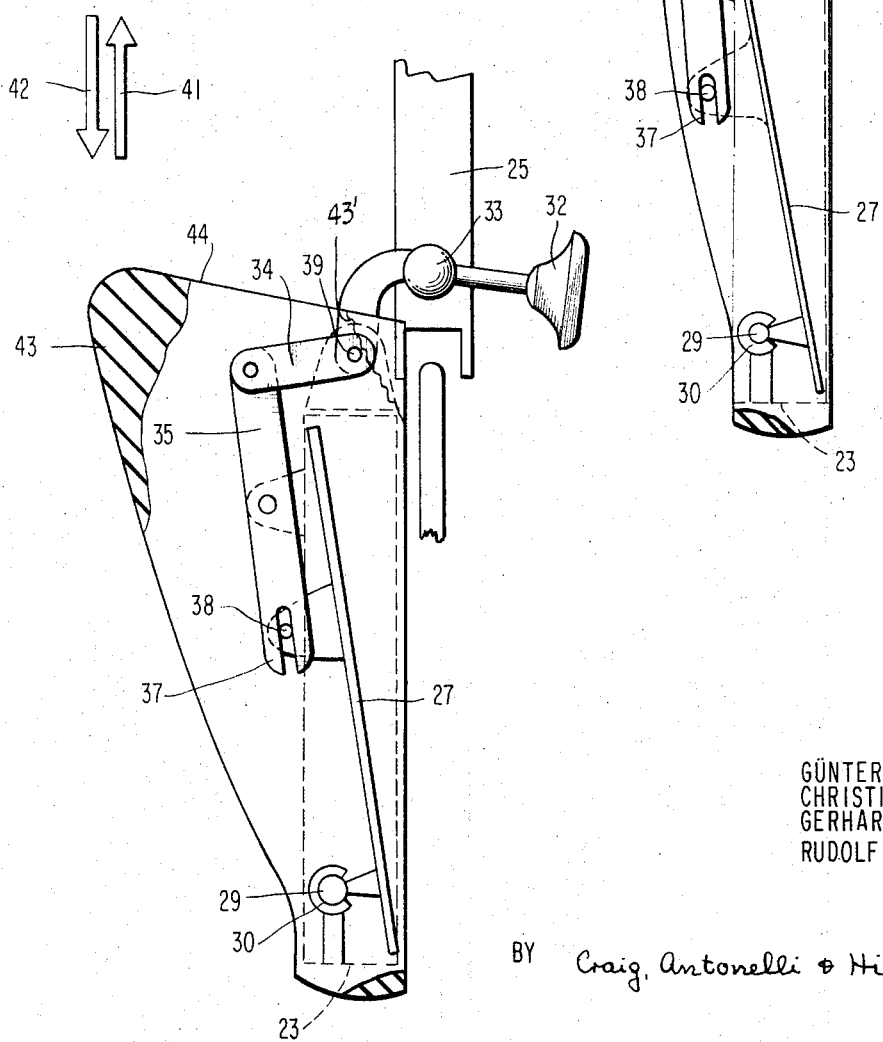
FIG. 8 is a plan view of a still further modified embodiment of an outside rearview mirror similar to FIGS. 5–7 in accordance with the present invention.

In the embodiment according to FIG. 8, which corresponds in its construction to the embodiment according to FIGS. 5 to 7, a rigid cover 43 of plastic material, metal or the like is provided in lieu of the rubber cap 40, which in the normal condition abuts with the surface 44 at the vehicle body and in case of a corresponding load breaks at an intended breaking place such as substantially along line 43' in FIG. 8 or tilts over as a whole.

While we have shown and described only three embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims:

We claim:

1. A remotely adjustable safety outside rearview mirror for motor vehicles comprising: a mirror housing, means for mounting said housing for pivotal movement in an impact direction; mirror support means disposed within said housing; actuating lever means, a portion of which is disposed remotely from said housing, for actuating said mirror support means; and rigid transmission means operatively connecting said actuating lever means with said mirror support means for adjusting the latter.

2. An outside rearview mirror according to claim 1, wherein said means for pivotably mounting said housing includes a hinge means.

3. An outside rearview mirror according to claim 2, wherein the axis of rotation of the hinge means is disposed approximately perpendicularly to said impact direction.

4. An outside rearview mirror according to claim 2, wherein said means for pivotably mounting the housing includes cap means for enclosing said mirror housing, said cap means being provided with aperture means leaving open an opening for the mirror glass.

5. An outside rearview mirror according to claim 4, wherein said cap means is made of elastic material.

6. An outside rearview mirror according to claim 4, further comprising means for securing the cap means at the vehicle.

7. An outside rearview mirror according to claim 4, wherein means are provided for securing said cap means to a vehicle door.

8. An outside rearview mirror according to claim 4, wherein said cap means are made of elastic material and are adapted to secure said hinge means to a vehicle.

9. An outside rearview mirror according to claim 2, wherein the axis of the rotation of said rigid transmission means is disposed approximately in the hinge axis at least in the tilted-in position of the mirror.

10. An outside rearview mirror according to claim 2, characterized in that the hinge means pivotably mounting the housing includes a pivot shaft on which is supported the mirror support means.

11. An outside rearview mirror according to claim 10, characterized in that the pivot shaft is provided with an extension having a substantially hemispherically shaped surface on which is supported a bushing means of the mirror support means having a corresponding surface.

12. An outside rearview mirror according to claim 11, characterized in that the bushing means of the mirror support means is surrounded by a further bushing means at which is secured the actuating lever means.

13. An outside rearview mirror according to claim 12, characterized in that the further bushing means of the actuating lever means and the bushing means of the support means are connected with each other in a base position by a detent means.

14. An outside rearview mirror according to claim 13, characterized in that the further bushing means and the first-mentioned bushing means are spring-loaded by means of a compression spring in the direction of the extension of the pivot shaft.

15. An outside rearview mirror according to claim 14, characterized in that a counter-abutment is arranged between the compression spring and the further bushing means which is provided with a substantially spherically shaped surface for the abutment at the further bushing means.

16. An outside rearview mirror according to claim 15, wherein said means for pivotably mounting the housing includes a cap means for enclosing said mirror housing, said cap means being provided with aperture means leaving open an opening for the mirror glass.

17. An outside rearview mirror according to claim 12, characterized in that the further bushing means and the first-mentioned bushing means are spring-loaded by means of a compression spring in the direction of the extension of the pivot shaft.

18. An outside rearview mirror according to claim 17, characterized in that a counter-abutment is arranged between the compression spring and the further bushing means which is provided with a substantially spherically shaped surface for the abutment at the further bushing means.

19. An outside rearview mirror according to claim 2, characterized in that said hinge means is adapted to connect said housing with a vehicle and means are provided for supporting said actuating lever means in a vehicle.

20. An outside rearview mirror according to claim 19, characterized in that an elastic detent means for fixing the base position of the housing is arranged in the hinge means.

21. An outside rearview mirror according to claim 20, characterized in that said means for supporting said actuating lever means is a spherically shaped head portion in a spherically shaped socket portion whereas the mirror support means is retained with a spherically shaped head portion in a spherically shaped socket of the housing means.

22. An outside rearview mirror according to claim 21, characterized in that the housing is surrounded with a rigid cover means which is pivotal as a whole.

23. An outside rearview mirror according to claim 22, characterized in that rigid cover means is provided with means forming an intentional place of breakage in case of impact force in a direction opposite the driving direction.

24. An outside rearview mirror according to claim 19, characterized in that said means for supporting said actuating lever means is a spherically shaped head portion in a spherically shaped socket portion whereas the mirror support means is retained with a spherically shaped head portion in a spherically shaped socket of the housing means.

25. An outside rearview mirror according to claim 2, characterized in that the housing is surrounded with a rigid cover means which is pivotal as a whole.

26. An outside rearview mirror according to claim 25, characterized in that said rigid cover means is provided with means forming an intentional place of breakage in case of impact force in a direction opposite the driving direction.

* * * * *